United States Patent
Ikeda et al.

(10) Patent No.: US 10,931,849 B2
(45) Date of Patent: Feb. 23, 2021

(54) INFORMATION PROCESSING APPARATUS

(71) Applicant: FUJI XEROX CO., LTD., Tokyo (JP)

(72) Inventors: Shinho Ikeda, Kanagawa (JP); Kenji Imamura, Kanagawa (JP); Masahiro Kobata, Kanagawa (JP); Takanori Fukuoka, Kanagawa (JP); Tokuji Ueda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 157 days.

(21) Appl. No.: 16/058,467

(22) Filed: Aug. 8, 2018

(65) Prior Publication Data

US 2019/0068825 A1   Feb. 28, 2019

(30) Foreign Application Priority Data

Aug. 22, 2017   (JP) .............................. JP2017-159665

(51) Int. Cl.
  *H04N 1/00*   (2006.01)
  *H04N 1/32*   (2006.01)

(52) U.S. Cl.
  CPC ..... *H04N 1/32593* (2013.01); *H04N 1/00891* (2013.01); *H04N 1/00904* (2013.01); *H04N 2201/0094* (2013.01)

(58) Field of Classification Search
  CPC ........... H04N 1/32593; H04N 1/00891; H04N 1/00904; H04N 2201/0094
  See application file for complete search history.

(56) References Cited

U.S. PATENT DOCUMENTS

| 10,228,749 | B2 * | 3/2019 | Sato | G06F 1/3296 |
| 2006/0197978 | A1 * | 9/2006 | Kishimoto | H04N 1/00915 358/1.15 |
| 2008/0002232 | A1 * | 1/2008 | Mori | H04N 1/00928 358/401 |
| 2010/0302582 | A1 * | 12/2010 | Yoshimura | H04N 1/4433 358/1.15 |
| 2011/0090830 | A1 * | 4/2011 | Churei | H04N 1/00891 370/311 |
| 2015/0373134 | A1 * | 12/2015 | Shimakawa | H04L 67/145 709/219 |
| 2016/0274919 | A1 * | 9/2016 | Masuyama | H04N 1/00928 |
| 2017/0244854 | A1 * | 8/2017 | Ito | H04N 1/00928 |

FOREIGN PATENT DOCUMENTS

| JP | 2012-051246 A | 3/2012 |
| JP | 2012051246 A * | 3/2012 |

* cited by examiner

*Primary Examiner* — Ted W Barnes
(74) *Attorney, Agent, or Firm* — Oliff PLC

(57) ABSTRACT

An information processing apparatus includes first and second controllers. The first controller executes processing dependent on an individual piece of hardware having a function and stores information indicating an operating state of an individual piece of hardware. The information is different according to the piece of hardware. The second controller executes processing which is not dependent on any piece of hardware. When the information processing apparatus is powered ON, the first controller sends the information stored in the first controller to the second controller. The second controller controls a corresponding piece of hardware by using the information sent from the first controller.

8 Claims, 3 Drawing Sheets

US 10,931,849 B2

INFORMATION PROCESSING APPARATUS

CROSS-REFERENCE TO RELATED APPLICATIONS

This application is based on and claims priority under 35 USC 119 from Japanese Patent Application No. 2017-159665 filed Aug. 22, 2017.

BACKGROUND

(i) Technical Field

The present invention relates to an information processing apparatus.

(ii) Related Art

A device, such as an image forming apparatus, may include a system controller and a device controller. The system controller controls portions which are not dependent on any hardware piece included in the device, while the device controller controls portions dependent on the corresponding hardware pieces (portions unique to the corresponding hardware pieces). Generally, the system controller is a device having high versatility, which is not dependent on hardware, while the device controller is a device used for more dedicated purposes, which is dependent on hardware.

SUMMARY

According to an aspect of the invention, there is provided an information processing apparatus including first and second controllers. The first controller executes processing dependent on an individual piece of hardware having a function and stores information indicating an operating state of an individual piece of hardware. The information is different according to the piece of hardware. The second controller executes processing which is not dependent on any piece of hardware. When the information processing apparatus is powered ON, the first controller sends the information stored in the first controller to the second controller. The second controller controls a corresponding piece of hardware by using the information sent from the first controller.

BRIEF DESCRIPTION OF THE DRAWINGS

An exemplary embodiment of the present invention will be described in detail based on the following figures, wherein.

DETAILED DESCRIPTION

Figure 1:
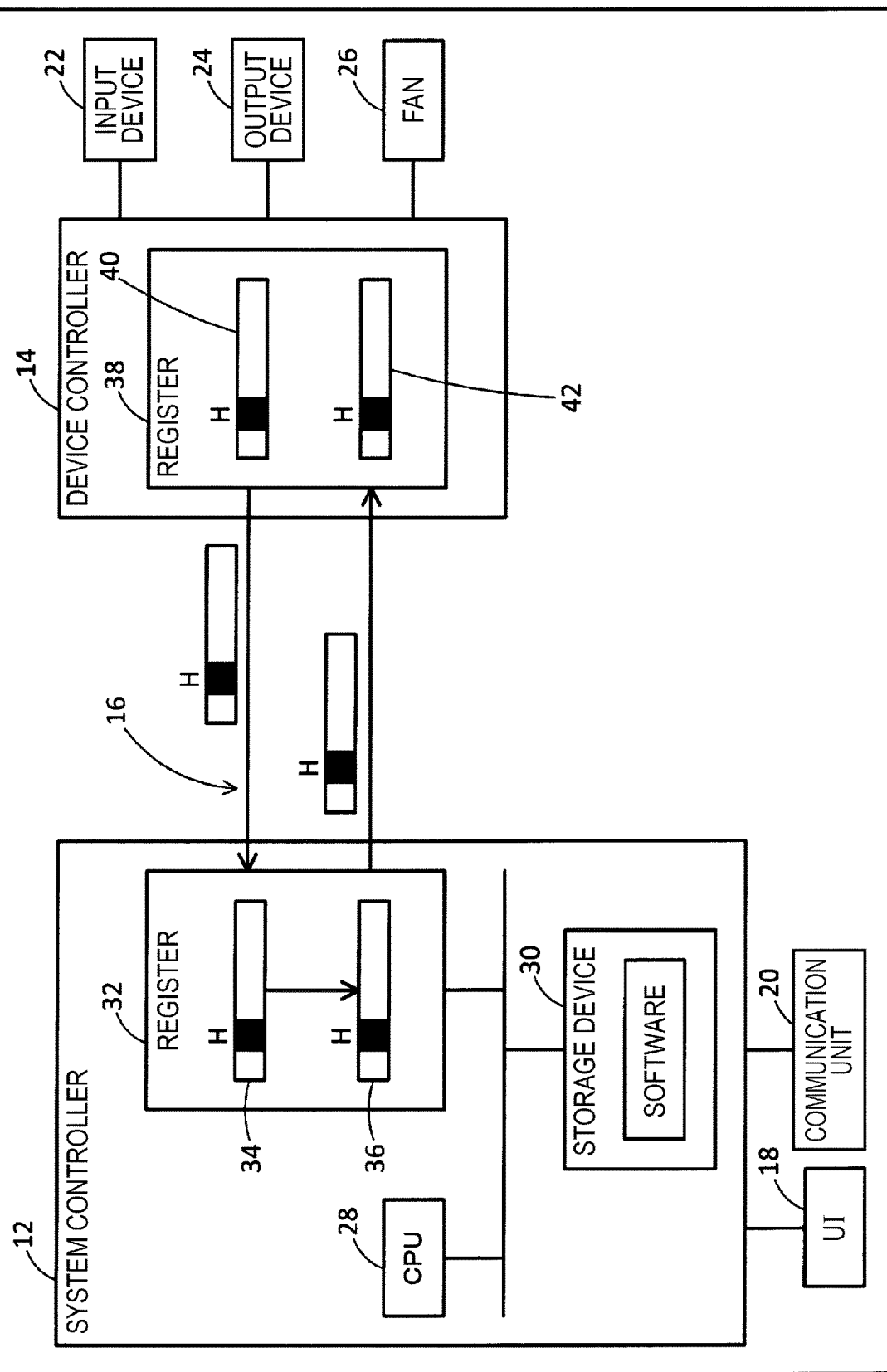
FIG. 1 is a block diagram illustrating an image forming apparatus according to the exemplary embodiment.

An image forming apparatus, which is an example of an information processing apparatus, according to the exemplary embodiment will be described below with reference to FIG. 1. FIG. 1 illustrates an image forming apparatus 10 according to the exemplary embodiment. The information processing apparatus according to the exemplary embodiment is not restricted to an image forming apparatus, and may be another apparatus, such as a video recorder, an image playback apparatus (including a video playback apparatus and a still-image playback apparatus), a sound playback apparatus (including a music player), and other digital devices. An image forming apparatus will be discussed below as an example of the information processing apparatus.

The image forming apparatus 10 is an apparatus having an image forming function. More specifically, the image forming apparatus 10 has at least one of a scan function (image reading function), a print function, a copy function, and a fax sending-and-receiving function. The image forming apparatus 10 may also have a function of communicating with another apparatus.

The individual elements of the image forming apparatus 10 will be described below.

The image forming apparatus 10 includes one or plural pieces of hardware having functions, a system controller 12, and a device controller 14. The system controller 12 corresponds to an example of a second controller. The device controller 14 corresponds to an example of a first controller.

The system controller 12 and the device controller 14 are connected to each other via a bus (high-speed bus, such as peripheral component interconnect (PCI) Express), and send and receive various items of information to and from each other. Examples of such information include command information indicating processing execute commands, status information indicating the status of the system controller 12 and that of the device controller 14, and information indicating detections results obtained by sensors, for example. The format of information sent and received between the system controller 12 and the device controller 14 may be the one selected from predetermined plural formats. The system controller 12 and the device controller 14 are connected to each other via a general-purpose communication channel 16. An example of the communication channel 16 is a serial line. If the serial line is not dependent on a central processing unit (CPU) 28 of the system controller 12 or software executed by the CPU 28, an existing interface, such as a universal asynchronous receiver/transmitter (UART) or an inter-integrated circuit (I2C) interface may be used. Alternatively, a newly defined interface may be used. When the status of the image forming apparatus 10 is changed, such as in the case of starting-up (power ON), shifting to a power-saving mode, returning from the power-saving mode, shutdown (power OFF), and the occurrence of an abnormality, the system controller 12 and the device controller 14 may send and receive information via the communication channel 16 so that they can synchronize with each other.

The image forming apparatus 10 includes a user interface (UI) 18, a communication unit 20, an input device 22, an output device 24, and a fan 26 as examples of hardware. The UI 18 includes a display and an operation unit. The display is a display device, such as a liquid crystal display. The operation unit is an input device, such as a touchscreen or a keyboard. The UI 18 may be an interface which serves both as a display and an operation unit, such as an operation panel. The communication unit 20 is a communication interface having a function of sending data to another apparatus and a function of receiving data from another apparatus via a communication path, such as a network. The communication unit 20 may be a communication interface having a wireless communication function or that having a wired communication function. The input device 22, which is a scanner, for example, reads a document and generates image data representing the image of the document. The output device 24, which is a printer, for example, receives image data or document data and forms an image or a document on a recording medium, such as a sheet. The fan 26 is a device for cooling the inside of the image forming apparatus 10. The image forming apparatus 10 may include a storage device, such as a hard disk or a memory. In the storage device, various items of data and various programs are stored. The image forming apparatus 10 may include hardware other than the above-described elements.

The system controller 12 includes the CPU 28, which is an example of a processor, a storage device 30, such as a memory, and a register 32. The system controller 12 has a function of executing processing which is not dependent on the hardware pieces included in the image forming apparatus 10, that is, a function of controlling portions of the image forming apparatus 10 which are not dependent on the types of hardware pieces, differences among hardware pieces, or differences among products. For example, the system controller 12 controls display and input of the UI 18, communication performed by the communication unit 20 (for example, communication with an external device via a communication path, such as a network), processing of image data and device information, image processing, user authentication processing, and memory management (such as reading of a secure digital (SD) card).

The CPU 28 includes a main CPU that controls hardware as a result of executing software. The CPU 28 may also include a sub-CPU. In the storage device 30, software executed by the main CPU is stored.

In the register 32, commands (command values) for controlling hardware are stored as an example of information indicating the operating state of hardware. The information indicating the operating state of hardware varies according to the piece of hardware. The register 32 includes an initial value storage register 34 and a control information sending register 36, for example. The initial value storage register 34 is a register for storing initial values of hardware as an example of information indicating the operating state of hardware. Examples of the initial values are a value which defines the operating state of hardware when the image forming apparatus 10 is powered ON (for example, a value which defines the operating state of hardware while software for controlling this hardware is starting), a value which defines the operating state of hardware while this software is shutting down or after it has shut down, and a value which defines the operating state of hardware when this software has become unable to control this hardware. An initial value is stored in the device controller 14, and at a predetermined timing, it is sent from the device controller 14 to the system controller 12 and is stored in the initial value storage register 34, which will be discussed later. The control information sending register 36 is a register for sending information indicating the operating state of hardware (initial value of hardware, for example) to the device controller 14. The initial value stored in the initial value storage register 34 is sent to the control information sending register 36 and is stored therein, and, at a predetermined timing, the initial value is sent from the system controller 12 to the device controller 14. Before an initial value is sent from the device controller 14 to the system controller 12, no initial value is stored in the initial value storage register 34 or the control information sending register 36. After an initial value is sent from the device controller 14 to the system controller 12, the initial value is stored in the initial value storage register 34 and the control information sending register 36. As a register for storing information indicating the operating state of hardware other than initial values, the register 32 may include a register for storing other commands for controlling hardware.

The device controller 14 includes a register 38 and a circuit, such as an application specific integrated circuit (ASIC), and has a function of executing processing dependent on the hardware pieces included in the image forming apparatus 10, that is, a function of controlling a portion unique to a hardware piece. More specifically, the device controller 14 controls the input device 22, the output device 24, the fan 26, post-processors, such as a stapler, and also control motors, heaters, and lamps, for example, based on information obtained from various sensors, for example.

The register 38 stores information indicating the operating state of a piece of hardware. This information is different according to the piece of hardware. An example of the information indicating the operating state of hardware stored in the register 38 is a command (command value) for controlling hardware. The register 38 includes an initial value sending register 40 and a control information receiving register 42. The initial value sending register 40 is a register for storing initial values of hardware as an example of information indicating the operating state of hardware and for sending the initial values to the system controller 12. The control information receiving register 42 is a register for storing information indicating the operating state of hardware (initial values of hardware, for example) sent from the system controller 12. At a predetermined timing, an initial value is sent from the system controller 12 to the device controller 14 and is stored in the control information receiving register 42, which will be discussed later. By using the initial value stored in the control information receiving register 42, the operation of hardware is controlled by the device controller 14. Before an initial value is sent from the system controller 12 to the device controller 14, no initial value is stored in the control information receiving register 42. After an initial value is sent from the system controller 12 to the device controller 14, the initial value is stored in the control information receiving register 42. As a register for storing information indicating the operating state of hardware other than initial values, the register 38 may include a register for storing other commands for controlling hardware.

The operation of the image forming apparatus 10 to be executed when controlling the operation of hardware will be described below. A description will be given of the operation of the image forming apparatus 10 when controlling the operation of the fan 26 as an example of hardware.

Figure 2:
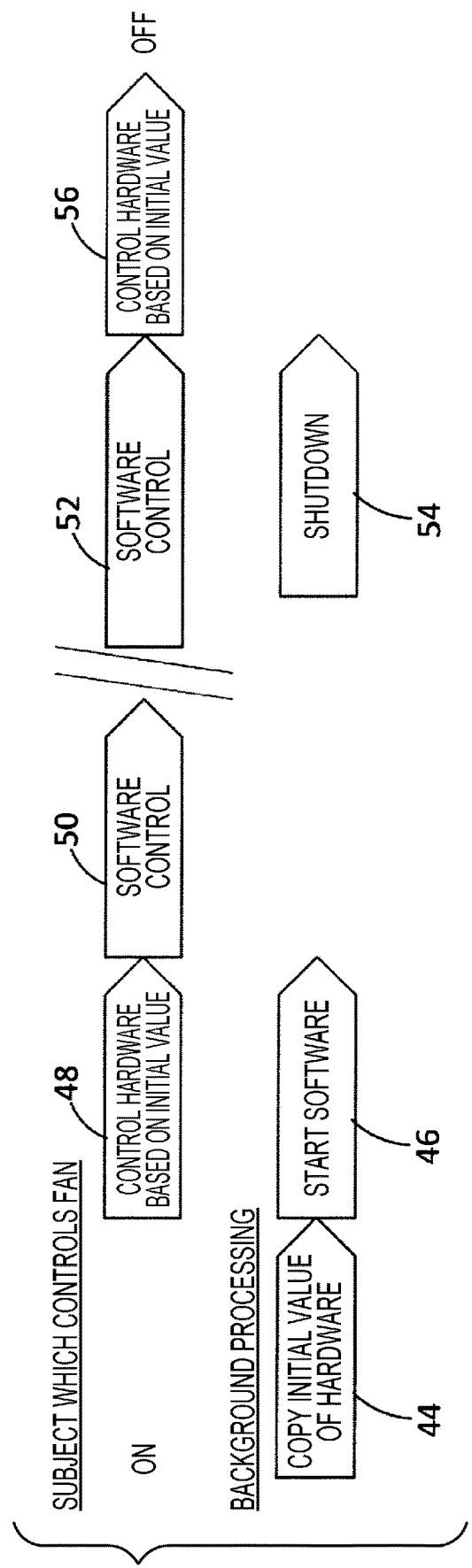
FIG. 2 is a diagram for explaining an example of hardware control.

The subject which controls the fan 26 and background processing will be discussed below with reference to FIG. 2. When the image forming apparatus 10 is powered ON, the initial value of the fan 26 as hardware is copied from the device controller 14 to the system controller 12, as indicated by operation 44 in FIG. 2. Turning ON the image forming apparatus 10 also starts software in the system controller 12 for controlling an individual hardware piece of the image forming apparatus 10, as indicated by operation 46 in FIG. 2. While this software is starting, the operation of the fan 26 is controlled based on the initial value, as indicated by operation 48. If the initial value is ON, the fan 26 is driven to rotate. If the initial value is OFF, the fan 26 is not driven. Upon completion of starting of software, the fan 26 is controlled by software, as indicated by operation 50. Thereafter, the fan 26 is controlled by software, as indicated by operation 52. In response to an instruction to shut down software (instruction to power OFF the image forming apparatus 10), software starts to shut down and is then completed, as indicated by operation 54. When software has started to shut down and has become no longer able to control the fan 26, the operation of the fan 26 is controlled based on the initial value, as indicated by operation 56. If the initial value is ON, the fan 26 is driven to rotate. If the initial value is OFF, the fan 26 is not driven. After the fan 26 has started to rotate, if the image forming apparatus 10 is powered OFF, or if a predetermined time has elapsed, or if the temperature of an element to be cooled down reaches a predetermined threshold or lower, the rotation of the fan 26 is stopped.

Figure 3:
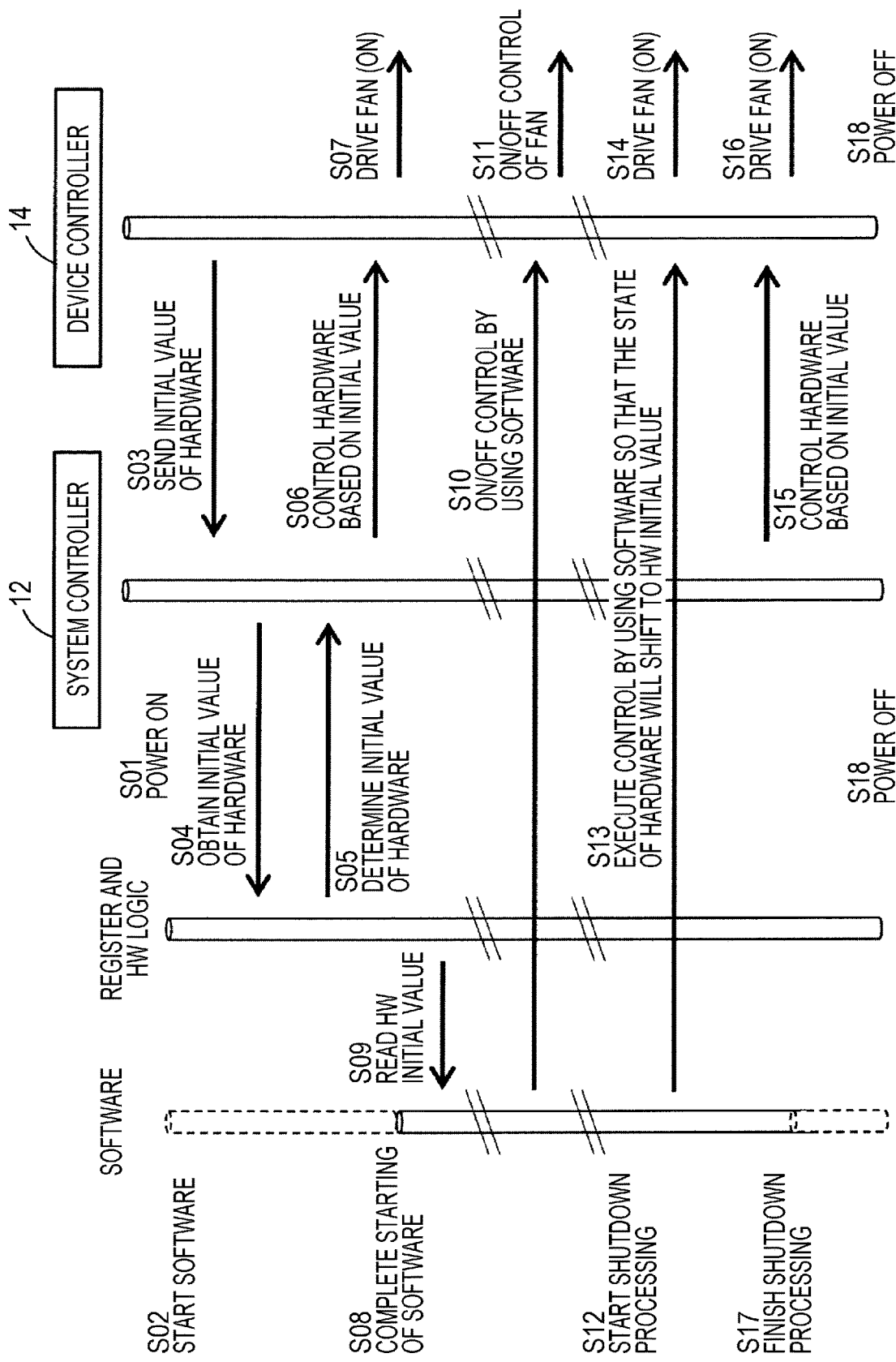
FIG. 3 is a flowchart illustrating an example of the operation of the image forming apparatus.

The operation of the image forming apparatus 10 will be described below in greater detail with reference to the flowchart of FIG. 3.

Before the image forming apparatus 10 is powered ON, no initial value is stored in the initial value storage register 34, the control information sending register 36, and the control information receiving register 42. The initial value is stored in the initial value sending register 40 in advance.

When the image forming apparatus 10 is powered ON in step S01, software stored in the system controller 12 is starting in step S02. Among the lines indicating the state of software in FIG. 3, the broken lines indicate a state in which the starting of software has not been completed, while the solid lines indicate a state in which the starting of software has been completed.

When the image forming apparatus 10 is powered ON, the initial value of the fan 26 is sent from the device controller 14 to the system controller 12 in step S03. The initial value has been stored in the initial value sending register 40 in advance, and is sent from the device controller 14 to the system controller 12 via the communication channel 16 when the image forming apparatus 10 is powered ON. That is, the initial value stored in the initial value sending register 40 is set to be sent from the device controller 14 to the system controller 12 upon turning ON the image forming apparatus 10. The initial value indicates "H" or "L". "H" is a value indicating "ON", while "L" is a value indicating "OFF". In the example in FIG. 1, the initial value indicates "H", that is, "ON". The initial value is preset based on the performance and structure of the image forming apparatus 10 integrating the fan 26 and the purpose of the use of the fan 26, for example. The initial value of hardware other than the fan 26 is also preset based on the purpose of the use of this hardware and the performance and structure of the image forming apparatus 10 integrating this hardware, and is sent from the device controller 14 to the system controller 12.

In the system controller 12, the initial value storage register 34 obtains the initial value sent from the device controller 14 and stores it in step S04. To obtain the initial value, the sub-CPU of the CPU 28 may be used. The initial value is then sent from the initial value storage register 34 to the control information sending register 36 and is stored therein. Then, the initial value of the fan 26 is determined in step S05. This initial value is then sent from the system controller 12 to the device controller 14 and is stored in the control information receiving register 42. That is, the initial value stored in the control information sending register 36 is set to be sent from the system controller 12 to the device controller 14. When the initial value is stored in the control information receiving register 42, the fan 26 is controlled based on this initial value in step S06. That is, as a result of sending the initial value from the system controller 12 to the device controller 14, the fan 26 can be controlled even before the starting of software has been completed. If the initial value indicates "H", that is, "ON", the fan 26 is driven in step S07. The fan 26 is rotated before the starting of software has been completed. If the initial value indicates "L", that is, "OFF", the fan 26 is not driven.

Upon completion of starting of software in step S08, the CPU 28 reads the initial value of the fan 26 from the register 32 in step S09. The CPU 28 also controls the operation (ON/OFF) of the fan 26 by executing this software in steps S10 and S11. In this manner, after completion of starting of software, the operation of the fan 26 is controlled by software.

Thereafter, when software starts to shut down in step S12, the CPU 28 executes in step S13 by using this software so that the state of the fan 26 will shift to the state indicated by the initial value. If the initial value indicates "H", that is, "ON", the fan 26 is driven to rotate in step S14. If the initial value indicates "L", that is, "OFF", the fan 26 is not driven. For example, in response to an instruction to power OFF the image forming apparatus 10, software starts to shut down.

Software becomes no longer able to control the fan 26 while being shutting down. The operation of the fan 26 is thus controlled based on the initial value stored in the control information sending register 36 in step S15. This initial value is sent to the device controller 14 and is stored in the control information receiving register 42, and the operation of the fan 26 is controlled based on this initial value. If the initial value indicates "H", that is, "ON", the fan 26 is driven to rotate in step S16. If the initial value indicates "L", that is, "OFF", the fan 26 is not driven.

Upon completion of the shutdown of software in step S17, the operation of the fan 26 is controlled based on the initial value stored in the control information receiving register 42 in step S16. When the image forming apparatus 10 is powered OFF in step S18, the fan 26 stops rotating.

As described above, in the exemplary embodiment, when the image forming apparatus 10 is powered ON, information indicating the operating state of hardware (initial value, for example) is sent from the device controller 14 to the system controller 12 that executes processing which is not dependent on hardware. The operation of hardware is controlled by using this information. Without the need to provide a function of making a request to obtain the operating state of hardware in the system controller 12, the system controller 12 is able to obtain information indicating the operating state of hardware so that hardware can be controlled.

In the exemplary embodiment, the device controller 14 has stored information indicating the operating state of hardware (initial value, for example) to be controlled. On the other hand, the system controller 12 has not stored such information, and instead, it obtains such information from the device controller 14 connected to the system controller 12. This eliminates the need for the system controller 12 to have a configuration to support an individual device controller 14, that is, a configuration to support an individual hardware piece. That is, without a configuration dependent on hardware or the device controller 14, the system controller 12 is able to maintain its versatility.

Information indicating the operating state of hardware stored in the initial value storage register 34, the control information sending register 36, and the control information receiving register 42 may be deleted when the image forming apparatus 10 is powered OFF. Alternatively, the information may remain in the initial value storage register 34, the control information sending register 36, and the control information receiving register 42.

In the above-described example, while software is starting, while software is shutting down, and after software has shut down, the operation of the fan 26 is controlled based on the initial value stored in the corresponding registers. Additionally, if software becomes unable to control hardware when being operating (if software crashes, for example), the operation of the fan 26 may also be controlled based on the initial value stored in the corresponding register. For example, if the system controller 12 detects that software control has become disabled, the operation of the fan 26 is controlled based on the initial value stored in the control information receiving register 42.

In the above-described example, in all the situations, that is, while software is starting, while software is shutting down, after software has shut down, and when software control has become disabled, the same command (the same initial value, for example) is used to control hardware. However, different commands may be used for the individual situations. For example, the above-described initial value may be used as a command while software is starting, a value different from this initial value may be used as a command while software is shutting down or after software has shut down, and a value different from the above-described initial value and the value used while software is shutting down or after software has shut down may be used as a command when software control has become disabled. The same value may be used for two of the above-described situations.

If different commands are set for the individual situations, all the commands may be sent from the device controller 14 to the system controller 12 when the image forming apparatus 10 is powered ON. For example, the initial value used as a command while software is starting, the value used as a command while software is shutting down or after software has shut down, and the value used as a command when software control has become disabled are sent from the device controller 14 to the system controller 12 when the image forming apparatus is powered ON. In another example, the initial value used as a command while software is starting, the value used as a command while software is shutting down or after software has shut down, and the value used as a command when software control has become disabled may be sent separately from the device controller 14 to the system controller 12. For example, when the image forming apparatus 10 is powered ON, the initial value used as a command while software is starting may first be sent from the device controller 14 to the system controller 12, and after the initial value has been sent or software has started, the value used as a command while software is shutting down or after software has shut down and the value used as a command when software control has become disabled may be sent from the device controller 14 to the system controller 12.

The system controller 12, which does not execute processing dependent on hardware, has higher versatility than the device controller 14, which executes processing dependent on hardware. Accordingly, the system controller 12 used for a high-speed image forming apparatus (high-speed machine) may also be used for a low-speed image forming apparatus (low-speed machine). The system controller 12 used for a color image forming apparatus (color machine) may also be used for a monochrome image forming apparatus (monochrome machine) without a color function. That is, if the versatility of the system controller 12 is increased to be used for multiple image forming apparatuses without depending on the type of image forming apparatus, the configuration (including the specifications) of the system controller 12 may not be required to be changed according to the individual image forming apparatus. In contrast, the device controller 14, which is dependent on hardware, is used for more dedicated purposes. If a device controller 14 used for a high-speed machine is also used for a low-speed machine or if a device controller 14 used for a color machine is also used for a monochrome machine, the redundancy of the image forming apparatus is increased.

Under the above-described circumstances, to deal with device controllers 14 used for more dedicated purposes, if dedicated lines dependent on individual device controllers (individual hardware pieces) are connected to the system controller 12, the versatility of the system controller 12 is restricted. On the other hand, if plural common dedicated lines which are not dependent on the device controllers 14 are provided, the versatility of the system controller 12 is less likely to be restricted. However, a dedicated line which is not used with a certain device controller 14 is also provided, thereby increasing the redundancy of the circuit configuration.

In this exemplary embodiment, a general-purpose communication channel, such as a serial line, is used for connecting the system controller 12 and the device controller 14. The versatility of the system controller 12 is thus less likely to be restricted than when dedicated lines dependent on the individual device controllers 14 are used. Additionally, the redundancy of the circuit configuration is reduced, compared with when plural common dedicated lines are used.

In this exemplary embodiment, it is possible to execute control in accordance with the operating state of hardware, which is different according to the hardware piece or the image forming apparatus 10. A fan will be taken as an example to describe that the operating state (initial value, for example) of hardware is different according to the individual image forming apparatus 10.

For example, in a high-functionality image forming apparatus, after it is powered ON and software for controlling hardware has started, a user may want to immediately execute processing, such as copy operation. Accordingly, after software has started, a fuser, which takes time to be heated, is powered ON earlier than any other component. A fan for the fuser is controlled by software so that software can execute processing, such as handling of an abnormal stop of the fan and regulating the speed of the fan so as to operate the fan quietly. Because of the multiple functions of the high-functionality image forming apparatus, it takes time to start software. It is not possible to control the fan by software until a certain time elapses after the fuser is powered ON. While the fan is not controlled by software, the heat of the fuser may melt toner located near the fuser. To avoid toner from melting (to prevent toner from reaching a predetermined temperature or higher), the fan for the fuser is required to be driven when hardware is in the initial state before software is ready to control the fan. That is, in the high-functionality image forming apparatus, it is necessary to determine the initial value of the fan so as to drive the fan after the image forming apparatus is powered ON and before software is started. In this case, the initial value of the fan is "ON".

In contrast, in a low-functionality image forming apparatus, it usually takes less time to start software because of the provision of fewer functions. Before the temperature of toner reaches a melting point due to the heat of the fuser, software is started and becomes ready to control the fan. In the low-functionality image forming apparatus, toner having a relatively high melting point may be used, and fewer components are used in the image forming apparatus and the fuser and toner may be separated from each other far enough to make the heat of the fuser less likely to conduct to toner.

When hardware is in the initial state, it is less necessary to drive the fan than in a high-functionality image forming apparatus. A user may rather want to turn OFF the fan to make the image forming apparatus quiet. That is, in a low-functionality image forming apparatus, the initial value of the fan is usually set to be "OFF".

While software is shutting down, some image forming apparatuses are required to continue driving the fan, some are not required to continue driving the fan, and some are required to stop driving the fan. In a high-functionality image forming apparatus, the fuser may not easily cool down, in which case, it may be necessary to continue driving the fan. In this case, software may be let continuously control the fan until the fuser cools down. However, this wastes power for operating software. In contrast, in a low-functionality image forming apparatus, the fan does not usually need driving while software is shutting down, and it may be turned OFF when software control has finished or even before. If the initial value of the fan is set to be "ON", when hardware is reset and returns to the initial state, the fan inconveniently starts driving.

As described above, the initial state of the fan is different according to the image forming apparatus 10. For example, the initial state of the fan varies depending on the performance and structure of the image forming apparatus 10. Regarding other hardware, too, the operating state is also different according to the hardware piece. In this exemplary embodiment, information indicating the operating state of hardware is stored in the register 38 of the device controller 14 according to the piece of hardware. Information indicating the operating state of a certain piece of hardware is sent from the device controller 14 to the system controller 12 at a predetermined timing (when the image forming apparatus 10 is powered ON, for example), and this piece of hardware is controlled based on the information. It is thus possible to execute control each piece of hardware in accordance with the performance and structure of the image forming apparatus 10.

In the exemplary embodiment, control operation of the fan 26 has been discussed by way of example. However, as in the fan 26, hardware other than the fan 26 is also controlled based on information indicating the operating state of this hardware (initial value, for example). The exemplary embodiment may be applicable, not only to a case in which the system controller 12 controls hardware, but also to a case in which the device controller 14 outputs a hardware FAIL signal, for example, to the system controller 12.

If the time to be taken from when power is turned ON until when the starting of software has been completed is equal to or greater than a predetermined threshold, control may be executed when power is turned ON so that hardware will be controlled by using information indicating the operating state of hardware (initial value, for example). If the above-described time does not exceed the threshold, control may be executed when power is turned ON so that hardware will be controlled by using software.

In the exemplary embodiment, the system controller 12 and the device controller 14 are connected to each other via the same serial line. Alternatively, the system controller 12 and the device controller 14 may be connected to each other via different serial lines, that is, a serial line for sending and receiving information indicating a first operating state (information indicating "ON" or "H", for example) and a serial line for sending and receiving information indicating a second operating state (information indicating "OFF" or "L", for example). In this case, information indicating "ON" and information indicating "OFF" are sent and received by using the different serial lines.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller that executes processing dependent on a piece of hardware having a function and that stores information indicating an operating state of the piece of hardware, the information being different according to the piece of hardware, of a plurality of pieces of hardware; and
   a second controller that executes processing which is not dependent on the piece of hardware, wherein
   in response to the information processing apparatus being powered ON, the first controller sends the information stored in the first controller to the second controller,
   the second controller includes software for controlling the pieces of hardware,
   the first controller sends the information to the second controller when the information processing apparatus is powered ON and before the software is started,
   when a time from when the power is turned ON until when the software is started is equal to or greater than a predetermined threshold, the second controller controls the piece of hardware by using the information sent from the first controller, and
   when the time from when the power is turned ON until when the software is started is less than the predetermined threshold, the second controller controls the piece of hardware by using the software.

2. The information processing apparatus according to claim 1, wherein the second controller controls the corresponding piece of hardware by using the information before the software is started.

3. The information processing apparatus according to claim 1, wherein the second controller controls the corresponding piece of hardware by using the information after the software has started to shut down.

4. The information processing apparatus according to claim 1, wherein the second controller controls the corresponding piece of hardware by using the information if the software becomes unable to control the piece of hardware.

5. The information processing apparatus according to claim 1, wherein, when controlling a corresponding piece of hardware, the second controller drives the piece of hardware by using the information or does not drive the piece of hardware by using the information.

6. The information processing apparatus according to claim 5, wherein the information indicates for each piece of hardware whether or not a corresponding piece of hardware will be driven.

7. The information processing apparatus according to claim 1, wherein:

the first and second controllers are connected to each other via a general-purpose communication channel; and the first controller sends the information to the second controller via the communication channel.

8. An information processing apparatus comprising:

first control means for executing processing dependent on a piece of hardware having a function and for storing information indicating an operating state of the piece of hardware, the information being different according to the piece of hardware, of a plurality of pieces of hardware; and second control means for executing processing which is not dependent on any piece of hardware, wherein in response to the information processing apparatus being powered ON, the first control means sends the information stored in the first control means to the second control means, the second control means includes software for controlling the pieces of hardware, the first control means sends the information to the second control means when the information processing apparatus is powered ON and before the software is started, when a time from when the power is turned ON until when the software is started is equal to or greater than a predetermined threshold, the second control means controls the piece of hardware by using the information sent from the first control means, and when the time from when the power is turned ON until when the software is started is less than the predetermined threshold, the second control means controls the piece of hardware by using the software.

* * * * *